Figure 1:
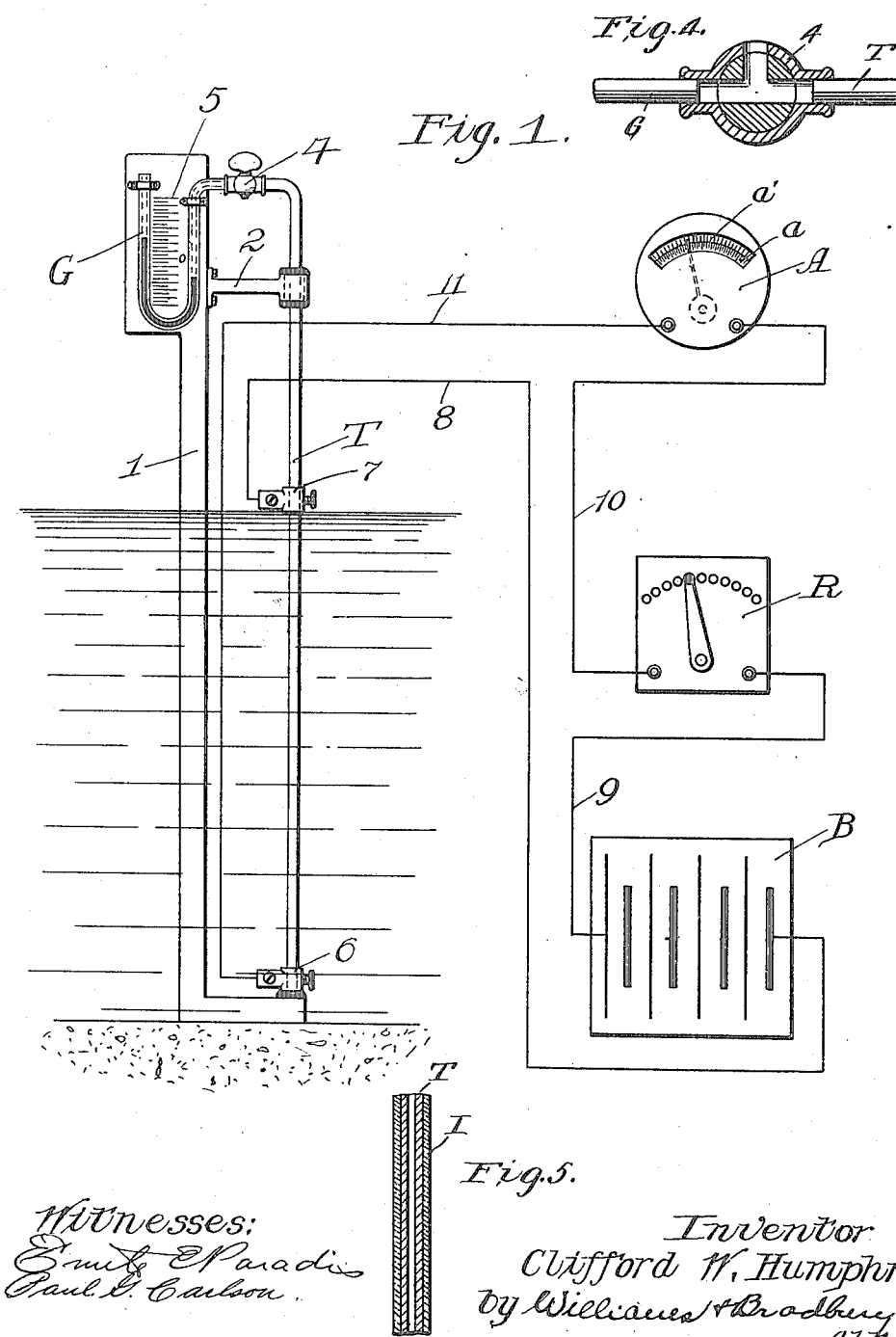

C. W. HUMPHREY.
METHOD AND APPARATUS FOR MEASURING THE FLOW OF FLUIDS.
APPLICATION FILED DEC. 17, 1915.

1,208,159.

Patented Dec. 12, 1916.
2 SHEETS—SHEET 2.

Witnesses:
Emile G. Sandes
Paul G. Carlson

Inventor
Clifford W. Humphrey
by Williams & Bradbury
Att'ys.

UNITED STATES PATENT OFFICE.

CLIFFORD W. HUMPHREY, OF CHICAGO, ILLINOIS.

METHOD AND APPARATUS FOR MEASURING THE FLOW OF FLUIDS.

1,208,159.      Specification of Letters Patent.      Patented Dec. 12, 1916.

Application filed December 17, 1915. Serial No. 67,310.

*To all whom it may concern:*

Be it known that I, CLIFFORD W. HUMPHREY, a citizen of the United States, residing at Chicago, in the county of Cook and State of Illinois, have invented a certain new and useful Improvement in Methods and Apparatus for Measuring the Flow of Fluids, of which the following is a full, clear, concise, and exact description, reference being had to the accompanying drawings, forming a part of this specification.

My invention relates to a method and apparatus for measuring the flow of fluids, and more specifically to a method and apparatus of this class particularly adapted to be made use of in ascertaining the flow of water in open streams, or open channels. I wish to have it understood, however, that my present invention, while particularly adapted to the use before mentioned, is not limited to such use as the invention when viewed in its broader aspects may be put to other uses as, for instance, the measurement of fluid flow through pipes and other closed conduits.

By making use of the method and apparatus hereinafter more fully set forth I am enabled to obtain the measurement of the velocity of liquid flow at any one spot in a stream, or the measurement of the mean velocity of liquid flow in any line through a stream, or the average velocity across the cross section of the stream. Moreover, but one reading of the apparatus in order to obtain each of such measurements is required after the apparatus has been properly arranged for the purpose of making the particular measurement desired.

Broadly speaking, the method hereinafter described and claimed utilizes two principles of physics which are: first, that if a body be immersed in a flowing fluid and heated to a temperature higher than the temperature of the fluid the heat lost to the flowing fluid by the said heated body depends upon, and is practically proportional to, the velocity of fluid flow; and, second, that the expansion of a column of air, or other suitable fluid, resulting from the application of heat thereto bears a certain relation to the number of heat units applied thereto. These principles of physics are recognized and utilized in carrying out the method which forms the subject matter of this invention.

In carrying out the method of my invention I prefer to make use of a novel form of apparatus comprising a tube which when the velocity of a flowing stream is to be ascertained is immersed therein. The aforesaid tube contains a fluid column, conveniently a column of air, which will expand under the influence of heat. Means is provided for electrically heating the tube and for regulating and measuring the heating current. Moreover means is provided for indicating the expansion under heating of the fluid column contained within the tube. These and other structural features of the apparatus of my invention, which may be given a plurality of forms, as well as the function thereof are set forth in the following detailed description wherein reference is made to the accompanying drawings which illustrate more or less diagrammatically a number of forms of apparatus embodying my invention.

Figure 2:
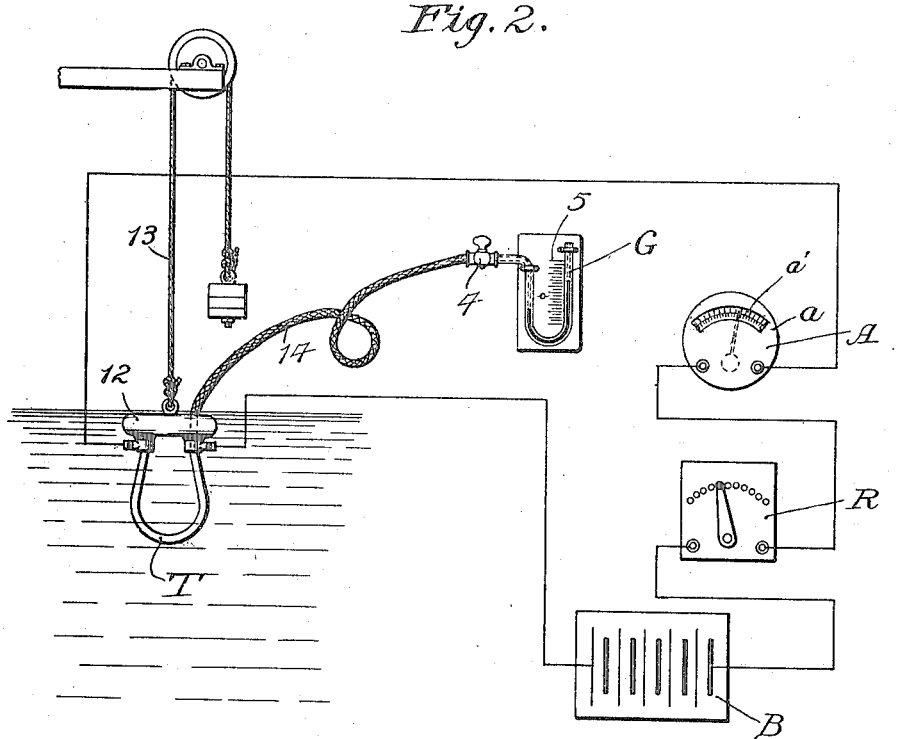
Figure 3:
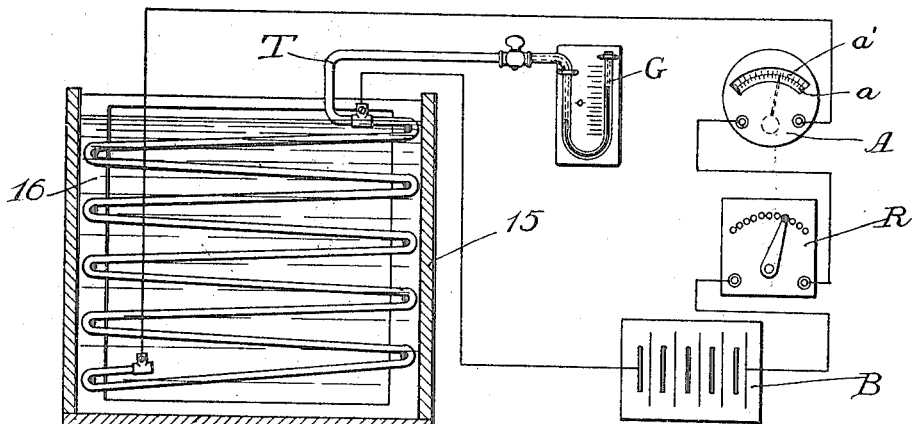

In the drawings, Figure 1 illustrates an apparatus particularly adapted for use in ascertaining the mean velocity of flow in a stream from the surface to the bottom thereof; Fig. 2 shows an apparatus designed primarily for ascertaining the velocity of flow at any selected spot in a stream; Fig. 3 shows an apparatus whereby the average velocity of flow across the entire transverse cross section of a stream may be ascertained; Fig. 4 is a detail sectional view of the pet cock forming a part of the apparatus of my invention, and Fig. 5 is a fragmentary sectional view of a capillary tube provided with a sheath of insulating material, the function of which will more fully hereinafter appear.

Similar characters of reference refer to similar parts throughout the several views.

Referring first to Fig. 1, the reference numeral 1 indicates a vertically disposed supporting element the lower end of which is conveniently conformed to rest upon the bed of an open stream, as illustrated. The support 1 is primarily intended to carry a capillary tube T, as is shown in the drawings. This tube has the lower end thereof resting upon the base of the supporting element and the upper end thereof supported by a bracket 2 extending laterally from the upper end of the supporting element. If the supporting element is constructed of electricity conducting material the capillary tube is insulated therefrom, as illustrated in the drawings. The capillary tube T in the particular embodiment of my invention now under consideration is formed of metal and has a relatively low co-efficient of electrical conductivity so that it may become heated by the passage of a current therethrough. At its upper end the tube T communicates with a pet cock 4 which in turn is connected with one leg of a U shaped gage G which may be supported in any convenient manner, but in Fig. 1 of the drawings is shown mounted upon the upper end of the supporting element 1. The gage G contains a quantity of mercury, or other suitable liquid, which stands at the zero point in both legs of the gage when the pressures in the upper ends of the legs of the gage are equal. Associated with the gage G is a suitable graduated scale 5. The pet cock 4 has not been illustrated in all of its detail in Fig. 1, but has been shown in section in Fig. 4. When in one position the pet cock connects the upper end of the tube "T" with the adjacent leg of the gage "G", and when the valve member thereof is turned through an angle of 180 degrees, that is, the position shown in Fig. 4, both the tube "T" and the adjacent leg of the U gage have communication with the atmosphere.

Fixed upon the lower end of the tube T is a terminal 6, and slidably mounted upon the upper end of the tube T is a second suitable terminal 7 which may be secured in any desired position along the length of the tube by a set screw, as illustrated, or by any other convenient means. The circuit connections, which have for the sake of clearness been diagrammatically illustrated, comprise the conductors 8, 9, 10, and 11 which connect that portion of the tube T between the terminals 6 and 7 in a series circuit with a storage battery B, a rheostat R and an ammeter A.

In utilizing the apparatus hereinbefore described to measure the flow of water in an open channel or river the tube T is vertically suspended in the water, as illustrated in Fig. 1, the lower end of the tube being located in proximity to the bed of the stream and the slidable terminal 7 adjusted at a point such that it is located at or near the surface of the water. The pet cock 4 is then opened so that when the column of air within the tube T assumes the temperature of the flowing water, the indicating liquid within the U gage comes to rest at the zero point due to the fact that atmospheric pressure then acts directly upon both legs of the U shaped column of indicating liquid. The pet cock is then closed to prevent further communication with the atmosphere and an electric current is passed through that portion of the tube T intermediate the terminals 6 and 7 causing the aforesaid portion of the tube to become heated. A portion of the heat thus created in the tube T is lost to the water surrounding the tube, the rate of dissipation of heat from the tube T varying with the velocity of the water in which the tube is immersed. The current traversing the circuit in which the capillary tube is connected is indicated by the ammeter A. The column of air confined within the tube T expands under the influence of the heat created by passing the current through the tube, as previously explained, the expansion of the air being indicated by the U gage G. Inasmuch as the heat which is utilized to raise the temperature of the column of air within the tube T is substantially equally to the total heat generated in the tube T minus that heat lost to the flowing water, it will be seen that the indication upon the U gage for any given electric current flow will bear a direct relation to the velocity of the flowing water.

In attaining the objects of my invention I prefer to control the flow of current by means of the rheostat R until a predetermined reading is obtained from the U gage. The current necessary to produce this predetermined showing on the U gage, and which varies with the velocity of the water in which the tube T is immersed, is indicated by the ammeter A. The velocity of the flowing water may then be ascertained by reference to a calibration curve wherein electric current has been plotted against velocity, or this information may be obtained from a suitable table whereon are shown velocities corresponding to the various electric currents required to produce a certain showing on the U gage. Moreover, instead of referring to a calibration curve, or a table, as previously explained, I contemplate providing the ammeter A with a scale $a'$ graduated in terms of velocity in addition to the usual scale $a$ which is graduated in amperes of current flow. The velocity found in the manner hereinbefore described is the mean velocity through the section from the bed of the stream to the surface of the water.

The apparatus illustrated in Fig. 2 differs from that illustrated in Fig. 1 in that the former is intended to be utilized in determining the velocity at any desired spot in a stream as distinguished from the velocity along a line extending through the stream from the top to the bottom thereof. In the apparatus of Fig. 2 the tube T is bent in the form illustrated and is carried by a weight 12 attached to a cable 13 whereby the tube T may be positioned at any desired point in the stream. The open end of the tube T is connected by a flexible conduit 14 and a pet cock 4 with a U gage similar in all material respects to the corresponding apparatus shown in Fig. 1 and which has been previously described. The electric circuit connections employed in this embodiment of my invention are identical with those previously described, the terminals associated with the bent tube T of Fig. 2 being rigidly secured to the extremities of the tube, as illustrated. After the bent tube T of Fig. 2 has been lowered to the proper depth the velocity of the flowing water is obtained in the manner set forth in the detailed description of Fig. 1.

In Fig. 3 I have illustrated at 15 the cross section of a flume which has associated therewith apparatus which may be utilized in carrying out my present method to ascertain the average velocity of liquid flow across the entire cross section of the flume. In this embodiment of my invention the capillary tube T extends back and forth across the flume and is supported by, and desirably insulated from, a frame work 16 arranged to fit within the flume, as illustrated. The sealed end of the tube T is provided with a terminal, as illustrated, and at its upper end the aforesaid tube is provided with another terminal located at or near the surface of the water within the flume. The U gage and pet cock illustrated in this figure are similar in all respects to the corresponding parts in the preceding figures. My improved method of ascertaining the velocity of fluid flow through the flume is carried out in the same manner as has been previously explained. It will be seen that, due to the fact that the tube T passes back and forth across the transverse section of the flume, the measurement of the velocity which is finally obtained is the measurment of the average velocity across the entire section of the flume.

In concluding the description of the method and apparatus of my invention I will point out that in some cases I contemplate providing the so-called "capillary" tube with a covering of insulation, which may be of any suitable material, to prevent possible short circuits or leakage through the water or other fluid, the velocity of which is being ascertained. Such an arrangement is illustrated in Fig. 5 of the drawings wherein "T" represents the capillary tube and "I" the insulation with which the capillary tube is provided. Moreover, I will state that the term "capillary" as used in describing the tubing which I prefer to employ, has not been used in its narrow or technical sense as meaning a tube which has a hair-like bore, but on the contrary, I refer to the capillary tubing of commerce, which has a bore of one-sixteenth of an inch, or thereabouts. As a matter of fact, I contemplate using any suitable tubing for the purpose described, and therefore do not limit myself to tubing of any particular bore.

From the foregoing description it will be seen that the method of my invention may be varied within wide limits and that various forms of apparatus may be designed for use in carrying the said method into practice. Therefore, I do not limit myself to the particular forms of apparatus herein described or the precise manner of carrying out the method herein described, but desire to claim all equivalents coming within the terms and spirit of the appended claims.

What I claim as new and desire to secure by Letters Patent of the United States is:

1. The method of measuring the flow of fluids which consists in inclosing a certain volume of fluid in a space substantially surrounded by the flowing fluid, whereby the temperature of the inclosed fluid is affected by the flowing fluid, heating the inclosed fluid and observing the relation existing between the energy utilized to heat the inclosed fluid and the resultant expansion of said inclosed fluid.

2. The method of measuring the flow of fluids which consists in inclosing a certain quantity of fluid under substantially atmospheric pressure in a space substantially surrounded by the flowing fluid, heating the fluid thus inclosed and observing the relation between the energy utilized to heat the inclosed fluid and the resultant expansion of said inclosed fluid.

3. The method of measuring the flow of fluids which consists in determining the amount of electricity required to so heat an electric resistance element, which is immersed in the flowing fluid and which incloses a quantity of gas otherwise free to expand, that said quantity of gas assumes a certain predetermined volume.

4. The method of measuring the flow of fluids which consists in inclosing a certain quantity of gas at the temperature of the flowing fluid and under substantially atmospheric pressure in a space substantially surrounded by the flowing fluid and determining the amount of electrical energy required to so heat said inclosed quantity of gas that said gas assumes a certain predetermined volume.

5. Apparatus for measuring the flow of fluid comprising a resistance element adapted to be immersed in a flowing fluid and arranged to inclose a column of gas together with electric circuit connections whereby a heating current may be passed through said resistance element, and means for determining the expansion of the gas under heating.

6. Apparatus for measuring the flow of fluids comprising in combination a metal tube having a low coefficient of electrical conductivity adapted to be immersed in the flowing fluid and adapted to contain a fluid column, a circuit for supplying heating current to said tube, an ammeter in said circuit, and means for ascertaining the expansion of the fluid within the tube under the influence of the heat generated in said tube.

7. Apparatus for measuring the flow of fluids comprising a tube adapted to be immersed in the flowing fluid, a manometer, said tube being closed at one end, means for connecting the other end of the tube with the manometer, or with the atmosphere as desired, means for heating said tube and means for measuring the energy utilized to heat the tube.

8. Apparatus for measuring the flow of fluids comprising a tube having a low co-efficient of electrical conductivity adapted to be immersed in the flowing fluid, a manometer, a valve whereby the interior of the tube may be connected with the manometer or the atmosphere as desired, means for passing an electric current through said tube to heat the latter, and means for measuring the electrical energy supplied to said tube for heating purposes.

9. Apparatus for measuring the flow of fluids comprising a tube having a low co-efficient of electrical conductivity adapted to be immersed in the flowing fluid, a manometer, a valve whereby the interior of the tube may be connected with the manometer or the atmosphere, means for passing an electric current through said tube, a dielectric sheath for said tube and means for measuring the electrical energy supplied to said tube for heating purposes.

10. Apparatus for measuring the flow of fluids comprising a container of material having a relatively low co-efficient of electrical conductivity immersed in the flowing fluid and adapted to inclose a quantity of fluid, means for indicating changes in the volume of the fluid contained in said container, means for passing an electric current through said container to heat the latter and the fluid therein contained and means for measuring said electric current.

11. Apparatus for measuring the flow of fluids comprising a tube having a relatively low co-efficient of electrical conductivity adapted to be immersed in the flowing fluid and adapted to inclose a quantity of fluid, means for indicating changes in the volume of the fluid contained in said tube, a dielectric sheath for said tube, means for passing an electric current through said tube to heat the latter and the fluid therein contained, and means for measuring said electric current.

In witness whereof, I hereunto subscribe my name this 14th day of December, A. D. 1915.

CLIFFORD W. HUMPHREY.

Witnesses:
    J. P. ALVEY, Jr.,
    J. N. CANAVAN.

Copies of this patent may be obtained for five cents each, by addressing the "Commissioner of Patents Washington, D. C."